(12) United States Patent
Düring et al.

(10) Patent No.: US 10,710,581 B2
(45) Date of Patent: Jul. 14, 2020

(54) TRANSPORTATION VEHICLE CONTROL DEVICE AND METHOD FOR DETERMINING AVOIDANCE TRAJECTORIES FOR A COLLISION-FREE AVOIDANCE MANEUVER OF MULTIPLE TRANSPORTATION VEHICLES

(71) Applicant: VOLKSWAGEN AKTIENGESELLSCHAFT, Wolfsburg (DE)

(72) Inventors: Michael Düring, Braunschweig (DE); Clemens Nietzschmann, Hannover (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 4 days.

(21) Appl. No.: 16/075,163

(22) PCT Filed: Dec. 16, 2016

(86) PCT No.: PCT/EP2016/081471
§ 371 (c)(1),
(2) Date: Aug. 3, 2018

(87) PCT Pub. No.: WO2017/137124
PCT Pub. Date: Aug. 17, 2017

(65) Prior Publication Data
US 2019/0047555 A1 Feb. 14, 2019

(30) Foreign Application Priority Data
Feb. 11, 2016 (DE) .................. 10 2016 202 070

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0956; B60W 30/0953; B60W 30/40; B60W 30/408; G08G 1/166; G08G 1/163; B62D 15/0265
See application file for complete search history.

(56) References Cited

FOREIGN PATENT DOCUMENTS

| DE | 10036276 A1 | 2/2002 |
|---|---|---|
| DE | 102006042666 A1 | 3/2008 |

(Continued)

OTHER PUBLICATIONS

M. Düring, K. Franke, R. Balaghiasefi, M. Gonter, M. Belkner and K. Lemmer, "Adaptive cooperative maneuver planning algorithm for conflict resolution in diverse traffic situations," 2014 International Conference on Connected Vehicles and Expo (ICCVE), Vienna, 2014, pp. 242-249. (Year: 2014).*

(Continued)

*Primary Examiner* — Aaron L Troost
*Assistant Examiner* — Chase L Cooley
(74) *Attorney, Agent, or Firm* — Barnes & Thornburg LLP (57) ABSTRACT

A method for determining avoidance trajectories for a collision-free avoidance maneuver of transportation vehicles, wherein trajectory data describing a collection of possible driving trajectories is received from at least one trajectory generator for each transportation vehicle in real time, and a respective avoidance trajectory is determined in real time for each transportation vehicle based on the collection of possible driving trajectories for that transportation vehicle. For each transportation vehicle, the driving trajectories are divided into groups, and each group is represented by a
(Continued)

single respective group trajectory. In at least one combination operation, each of the group trajectories of each transportation vehicle is selected and a resulting driving maneuver is checked based on the selected group trajectories to determine if the driving maneuver fulfils a predetermined optimization criterion, and the avoidance trajectories are determined based on the group trajectories of a combination operation with a fulfilled optimization criterion.

24 Claims, 6 Drawing Sheets

(51) Int. Cl.
*B62D 15/02* (2006.01)
*G08G 1/16* (2006.01)

(52) U.S. Cl.
CPC ......... *B62D 15/0265* (2013.01); *G08G 1/163* (2013.01); *G08G 1/166* (2013.01); *B60W 2556/65* (2020.02); *B60W 2756/10* (2020.02)

(56) References Cited

FOREIGN PATENT DOCUMENTS

| DE | 102007058538 A1 | 6/2009 |
|---|---|---|
| DE | 102010033776 A1 | 5/2011 |
| DE | 102011106176 A1 | 2/2012 |
| DE | 102012005272 A1 | 10/2012 |
| DE | 102013005362 A1 | 10/2013 |
| DE | 102013016488 A1 | 4/2015 |
| DE | 102014215244 A1 | 2/2016 |

OTHER PUBLICATIONS

P. Tan, M. Steinbach, V. Kumar, "Introduction to Data Mining," 2005, Pearson, 1st Edition, 487-511. (Year: 2005).*

Branicky et al.; Path and Trajectory Diversity: Theory and Algorithms; 2008 IEEE International Conference on Robotics and Automation; Workshop on: Towards Autonomous Agriculture of Tomorrow; May 19, 2008; pp. 1359-1364.

Düring et al.; Adaptive cooperative maneuver planning algorithm for conflict resolution in diverse traffic situations; 2014 International Conference on Connected Vehicles and Expo; IEEE; Nov. 3, 2014; pp. 242-249.

Hermes; Action recognition and prediction using trajectory classification; Bielefeld University Library; Aug. 30, 2012 downloaded from https://pub.uni-bielefeld.de/download/2610373/2610374.

Search Report for German Patent Application No. 10 2016 202 070.6; dated Sep. 12, 2016.

Search Report for International Patent Application No. PCT/EP2016/081471; dated Mar. 14, 2017.

* cited by examiner

TRANSPORTATION VEHICLE CONTROL DEVICE AND METHOD FOR DETERMINING AVOIDANCE TRAJECTORIES FOR A COLLISION-FREE AVOIDANCE MANEUVER OF MULTIPLE TRANSPORTATION VEHICLES

PRIORITY CLAIM

This patent application is a U.S. National Phase of International Patent Application No. PCT/EP2016/081471, filed 16 Dec. 2016, which claims priority to German Patent Application No. 10 2016 202 070.6, filed 11 Feb. 2016, the disclosures of which are incorporated herein by reference in their entireties.

SUMMARY

Illustrative embodiments relate to a method for determining avoidance trajectories for a collision-free avoidance maneuver of multiple transportation vehicles. For each transportation vehicle, a family of driving trajectories that can be used by the transportation vehicle during the avoidance maneuver is determined, and then for each transportation vehicle, on the basis of its family of possible driving trajectories an avoidance trajectory is determined, so that from the combination of the determined avoidance trajectories of all transportation vehicles the collision-free avoidance maneuver is obtained. Illustrative embodiments also relate to a control device, by which the disclosed method can be carried out, and a transportation vehicle that has the disclosed control device.

BRIEF DESCRIPTION OF THE DRAWINGS

An exemplary embodiment is described in the following. Shown in the Figures are.

DETAILED DESCRIPTION

Disclosed embodiments relate to a method for determining avoidance trajectories for a collision-free avoidance maneuver of multiple transportation vehicles. For each transportation vehicle, a family of driving trajectories that can be used by the transportation vehicle during the avoidance maneuver is determined, and then for each transportation vehicle, on the basis of its family of possible driving trajectories an avoidance trajectory is determined, so that from the combination of the determined avoidance trajectories of all transportation vehicles the collision-free avoidance maneuver is obtained. Disclosed embodiments also relate to a control device, by which the disclosed method can be carried out, and a transportation vehicle that has the disclosed control device.

A method of the type described is known, for example, from DE 10 2012 005 272 A1. In this method, upon detection of an impending potential collision between two transportation vehicles these transportation vehicles are coordinated such that an avoidance trajectory is determined for each of the transportation vehicles. Possible, collision-free motion-hypothesis trajectory pairs from a driving trajectory of each of the transportation vehicles are evaluated as to whether they represent a potentially suitable collision-free motion-hypothesis trajectory pair, which can be used for the avoidance maneuver.

DE 10 2013 005 362 A1 also discloses an analysis of a traffic situation, which describes the future movement behavior for transportation vehicles on the basis of motion trajectories and from this, determines the level of risk obtained for each combination of motion trajectories.

From DE 10 2011 106 176 A1 it is also known to determine a family of possible driving trajectories for each of a set of transportation vehicles and then to combine driving trajectories of each transportation vehicle in pairs to predict and assess the resulting driving maneuver.

The determination of driving trajectories that can be followed by a transportation vehicle starting from a current driving condition is known, for example, from a publication by During et al. (During, M. et al., "Adaptive cooperative maneuver planning algorithm for conflict resolution in diverse traffic situations," in: Connected Vehicles and Expo (ICCVE), 2014 International Conference on, pp. 242-249, 3-7 Nov. 2014. doi: 10.1109/ICCVE.2014.7297550). Devices for generating a family of possible driving trajectories for a transportation vehicle are therefore known from the prior art. The corresponding system is described here as a trajectory generator.

A transportation vehicle can have a trajectory generator which only generates the family of possible driving trajectories for the transportation vehicle itself, or which additionally generates a family of possible driving trajectories for other third-party transportation vehicles present in the transportation vehicle environment on the basis of sensor data. If a trajectory generator of a transportation vehicle has determined a family of possible driving trajectories, this can be described by trajectory data that can be transferred to another transportation vehicle, so that the latter can compare the family of possible driving trajectories of the third-party transportation vehicle with the family of its own possible driving trajectories.

Thus, methods are known from the prior art to plan the driving maneuvers between a plurality of transportation vehicles. This means that a conflict resolution of a critical traffic situation with multiple transportation vehicles is then possible by combining their options for action as the possible driving trajectories. The objective of such cooperative maneuver planning is a collision-free combination of trajectories for an avoidance maneuver of the transportation vehicles. If such a collision-free combination has been found, this is evaluated using a cost function or optimization criterion, so that an optimal solution can ultimately be selected.

The performance of trajectory generators can be so high, however, that the family of possible driving trajectories is very numerous. This means that the number of the described driving trajectories can be so large that a review of the driving situations resulting from the combination of all possible driving trajectories of multiple transportation vehicles cannot be performed within the time available before a possible collision. Therefore, in the case of a large number of possible driving trajectories the real-time calculation of a collision-free solution is a challenge. The combination problem to be solved has exponential complexity in relation to the calculated transportation vehicles and in relation to the number of possible driving trajectories per transportation vehicle, polynomial complexity. This means that above a certain number of transportation vehicles or trajectories, the calculation is no longer fully real-time capable, in other words within the few hundred milliseconds that remain before a predicted collision.

However, it is also desirable to avoid using only a portion of the potential driving trajectories by limiting a trajectory generator such that, for example, it only considers avoidance courses or driving trajectories in which a transportation vehicle swerves to the left, for example. This could lead to valuable options for action being overlooked that might lead to a collision-free resolution or to a lesser amount of damage, that is to say a more optimal result of the avoidance maneuver.

The disclosed embodiments provide for a maximally comprehensive review of the available driving trajectories for transportation vehicles on a collision course within the remaining time until the necessary automatic initiation of an avoidance maneuver.

A method is provided for determining avoidance trajectories for a collision-free avoidance maneuver of transportation vehicles. Every transportation vehicle is assigned an avoidance trajectory along which it should travel, so that as a result the collision-free avoidance maneuver is obtained for all transportation vehicles. In the method the following operations are performed by a control device. From at least one trajectory generator, for each transportation vehicle trajectory data are acquired or received which describe a family of possible driving trajectories of the transportation vehicle. Thus, one trajectory generator can generate the respective trajectory data for all transportation vehicles, or the trajectory generators of a plurality of the transportation vehicles or all transportation vehicles each transfer their own trajectory data of their transportation vehicle to the control device.

As is already known from the prior art, for each transportation vehicle a respective avoidance trajectory is determined for the transportation vehicle on the basis of its family of potential driving trajectories, so that from the combination of the determined avoidance trajectories of all transportation vehicles the collision-free maneuver is obtained.

Disclosed embodiments enable these desired avoidance trajectories to then be determined within a specified time interval so the avoidance maneuver can be carried out in good time. On the basis of the particular family of possible driving trajectories of each transportation vehicle, a classification of the driving trajectories is first performed. In this classification operation, for each transportation vehicle the driving trajectories of its family are classified into groups. Each group therefore comprises a plurality of the driving trajectories from the family. The groups are disjoint. Each group is then represented by a single respective group trajectory. For each transportation vehicle one of its group trajectories can now be selected. The resulting combination of group trajectories can be used to reconstruct or to simulate the resulting coordinated driving maneuver of the transportation vehicles and to test it to determine whether the desired maneuver is obtained. Such a test for specific group trajectories is designated here as a combination operation. In other words therefore, in at least one such combination operation one of the group trajectories of each of the transportation vehicles is selected and on the basis of the selected group trajectories a resulting coordinated driving maneuver of the transportation vehicles is tested to determine whether the driving maneuver satisfies a predetermined optimization criterion. By specifying the properties or conditions of the optimization criterion it is possible to adjust what is ultimately used as a suitable avoidance maneuver to avoid the collision or to reduce, for example, the severity of the collision.

Finally, the group trajectories of such a combination operation, in which the optimization criterion has been met, are used as the avoidance trajectories. If the transportation vehicles then follow the selected avoidance trajectories, the resulting corresponding coordinated maneuver is one for which the optimization criterion is actually satisfied. Using the optimization criterion it can be specified, for example, that during the avoidance maneuver the transportation vehicles must not fall below a predetermined minimum distance from each other and/or from another stationary object in the surroundings.

The method provides the benefit that not all of the plurality of possible actions actually need to be checked, rather a plurality of the possible trajectories is represented by each of the group trajectories and is therefore checked. For example, a family of more than 50, in particular, more than 80 possible driving trajectories can be represented by a number of group trajectories fewer than 20, in particular, fewer than 10. It is then sufficient to check these group trajectories to determine for all possible driving trajectories which of them are suitable in principle, i.e., for which there is any possibility at all that they might fulfill the optimization criterion.

The disclosed embodiments also include optional extensions.

To actually prevent the predicted collision using the avoidance trajectories, one extension provides that, by the respective avoidance trajectory in the respective transportation vehicle, a driver assistance system of the transportation vehicle is configured to perform the avoidance maneuver. In other words, therefore none of the drivers of the transportation vehicles must actually follow the selected avoidance trajectory, but instead this is carried out automatically by the respective driver assistance system of the transportation vehicle. This results in an automated implementation of the avoidance maneuver.

One extension relates to the problem that the possible avoidance trajectories of a family need to be assessed quantitatively (thus in terms of numbers), to determine how representative a group trajectory is for individual driving trajectories. This extension provides that the classification operation to classify the driving trajectories of a family into groups comprises the fact that similarity values or similarity data are determined for each driving trajectory of the family. These are determined on the basis of a predetermined similarity measure with respect to a respective reference trajectory. The driving trajectories are thus not firstly compared with each other, but in each case with a reference trajectory which is defined for the respective transportation vehicle. Such a reference trajectory can describe, for example, a uniform driving of the transportation vehicle in a straight line. Driving in a straight line here means driving tangentially to the center of the driving lane, or driving straight ahead as a result of maintaining the current direction of travel of the transportation vehicle. The reference trajectory can also describe the maintenance of the current driving course of the transportation vehicle, for example, as the transportation vehicle drives round a bend. The similarity data therefore indicate for each driving trajectory how similar it is to the reference trajectory. Therefore, the data obtained relate to a difference of each driving trajectory from the reference trajectory. This extension has the benefit that not all driving trajectories must be compared to each other in pairs, which means an evaluation of the driving trajectories is possible with less computational effort.

To determine such similarity data, an extension provides that a similarity measure comprises the fact that for a predetermined number of time operations n, in each case a deviation $\Delta X$ along an extension direction of the reference trajectory and a deviation $\Delta Y$ along a direction perpendicular to the reference trajectory is determined, and then from the respective deviations of all time operations a sum total K1 of the longitudinal deviation and a sum total K2 of the lateral deviation is determined. Furthermore, at the last time operation or for the last time operation the resulting final deviation K3 is determined longitudinally and/or perpendicularly ($\Delta Yn$) to the reference trajectory. A deviation in the longitudinal direction is obtained, for example, by a transportation vehicle speed difference. A lateral deviation is obtained by a different steering angle. Thus, the similarity of each driving trajectory to the reference trajectory is determined on the basis of the spatial course of the trajectories, wherein exactly three criteria, namely the deviation in X (longitudinally), the deviation in Y (laterally) and the final deviation, optionally final transverse deviation, are taken into account. This results in three values, namely the two sum totals K1, K2 of the longitudinal deviation and the lateral deviation, and the final deviation K3. These values then define a vector or point in space in a three-dimensional feature space. Thus a comparison of driving trajectories with each other is possible, for example, as a Euclidean distance measure. The extension therefore has the benefit that each driving trajectory, regardless of its complexity, which is to say the volume of the trajectory data, is represented by a single point in the feature space, which can be compared with other points, that is to say other driving trajectories, with little computational effort and thus in a correspondingly short time.

In accordance with an extension, a predefined number of groups can be defined per family. The number of the groups indirectly specifies the time required to check all group trajectories. By specifying the number, the time required is therefore predictable. Optionally, the number of groups is defined depending on the time remaining until the collision and/or until the planned initiation of the avoidance maneuver.

On the basis of the possible driving trajectories, in particular, on the basis of the description of the driving trajectories as points of similarity data, an extension provides that the classification operation is carried out by a cluster analysis. Thus, for example, the k-means++ algorithm can be used to determine a predefined number of groups (David Arthur and Sergei Vassilvitskii. "K-means++: The Advantages of Careful Seeding", in: Proceedings of the Eighteenth Annual ACM-SIAM Symposium on Discrete Algorithms. SODA '07. New Orleans, La.: Society for Industrial and Applied Mathematics, 2007, p. 1027-1035. ISBN: 978-0-898716-24-5). For example, the classification can be performed in a convenient way on the basis of the similarity data, for example, based on the Euclidean measure or the Euclidean metric. As a result, driving trajectories that are assigned to the same group occupy spatially similar areas of the road. Thus, on the basis of such a cluster analysis a targeted sampling of the solution space is achieved, in which the individual points that represent the driving trajectories are located.

Once each group is determined, the group trajectory must also be selected for each group. A related extension provides that for each of the transportation vehicles from each of the groups, a mean driving trajectory or a random driving trajectory is selected as the respective group trajectory. The mean driving trajectory is, for example, the center that is specified for each cluster by the cluster analysis. The mean driving trajectory has the benefit that it can have the smallest mean distance from all driving trajectories that it represents. The random trajectory has the benefit that the group trajectory is selected from the possible driving trajectories of the group with little computational effort.

An extension allows the driving trajectories to be more accurately matched to each other. So far it has been described that the respective group trajectory of each transportation vehicle by which the optimization criterion can be met, is itself used as the avoidance trajectory. In general however, it can be provided that not the group trajectory itself, but one of the driving trajectories from the associated group is used as the avoidance trajectory. The extension provides namely that all combination operations for checking the group trajectories are carried out within a predefined time interval, namely the time interval until the required start of the avoidance maneuver. In the event that such a combination operation that satisfies the optimization criterion is found prior to the end of the time interval, in addition at least one driving trajectory from the group which is represented by the group trajectory that satisfies the optimization criterion is tested for the optimization criterion. On the basis of the group trajectory therefore, the group that potentially contains one or more driving trajectories is determined, by which the optimization criteria can be satisfied. Within this group at least one other driving trajectory is then used to perform a particular combination operation. Thus the time remaining can be used to further optimize the avoidance maneuver based on the optimization criterion. An extension also provides for testing more of the groups. The previously described use of time corresponds to a search for a better result within the existing groups.

However, it could also be used to further examine a plurality of groups. To this end the optimization criterion can comprise one or more of the inherent conditions. For example, in the manner described the distance between the transportation vehicles can be kept greater than a predetermined minimum distance, or else can be numerically maximized. It can also be provided that a longitudinal acceleration and/or a lateral acceleration for the transportation vehicles should be minimized, or at least kept below a particular threshold value. It can also be provided that the optimization criterion provides an absolute comparison of all possible combinations, in other words the optimization criterion provides the determination of the absolute minimum value or most optimal value from all the resulting values (e.g., distance and/or acceleration), so that all group trajectories must first be combined with each other to check which of the group trajectories satisfy the optimization criterion. Other suitable optimization criteria can also be obtained from the cited prior art.

As already stated, the disclosed embodiments also include a control device for a transportation vehicle, by which the disclosed method can be carried out. The disclosed control device has a receiving device for receiving trajectory data, which in the manner described above each describe a family of possible trajectories of a transportation vehicle. In addition, the control device has a processor device, which is configured to carry out an exemplary embodiment of the disclosed method. The processor device can be based on one or more micro-controllers and/or one or more microprocessors. As a receiving device, for example, a bus interface can be provided, via which the control device receives the trajectory data from a trajectory generator. The receiving device can also comprise, for example, a radio receiver for receiving trajectory data from another transportation vehicle. The receiving device can also be a program module which receives the trajectory data from a trajectory generator, which is implemented as a program module on the same processing device as a part of the control device.

Finally, the disclosed embodiments also include a transportation vehicle which has an exemplary embodiment of the disclosed control device. The disclosed transportation vehicle may be designed as a road transportation vehicle, in particular, as a passenger car or truck.

In the exemplary embodiment, the components of the embodiment described represent individual features of the disclosure to be considered independently of each other, which also extend the disclosure independently of each other and thus are also to be regarded, either individually or in a combination, other than the one shown, as an integral part of the disclosure. Furthermore, the embodiment described can also be extended to include other features of the disclosure already described.

In the figures, functionally equivalent elements are provided with the same reference numerals.

Figure 1:
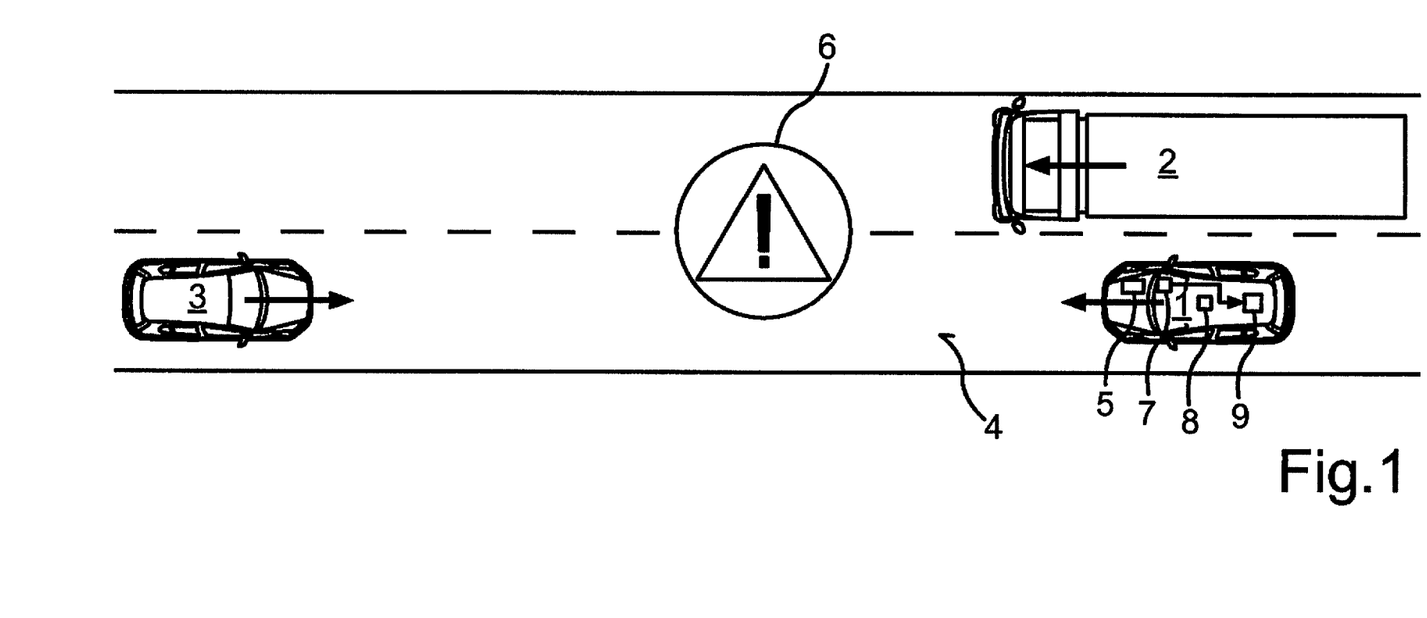
FIG. 1 shows a schematic representation of a driving scenario with transportation vehicles that are coordinated by a control device in an exemplary embodiment of the disclosed transportation vehicle.

FIG. 1 shows an example of three transportation vehicles 1, 2, 3, of which the transportation vehicle 1 is overtaking the transportation vehicle 2 and is driving in an oncoming lane 4, in which it is on a collision course with the transportation vehicle 3. It is now possible, for example, by an environment monitoring device 5 of the transportation vehicle 1, to detect a collision risk 6 and to generate a signal for initiating avoidance maneuvers. In a known manner, for example, by one trajectory generator 7 alone or by trajectory generators of all transportation vehicles 1, 2, 3, trajectories data 8 can then be generated, which can be broadcast or transmitted, for example, to a control device 9 of the transportation vehicle 1. If trajectory generators of the transportation vehicles 2, 3 also generate trajectory data, these can be transmitted, for example, via a vehicle-to-vehicle communication, for example, in accordance with a WiFi standard, to the transportation vehicle 1 and from there to its control device 9.

Figure 2:
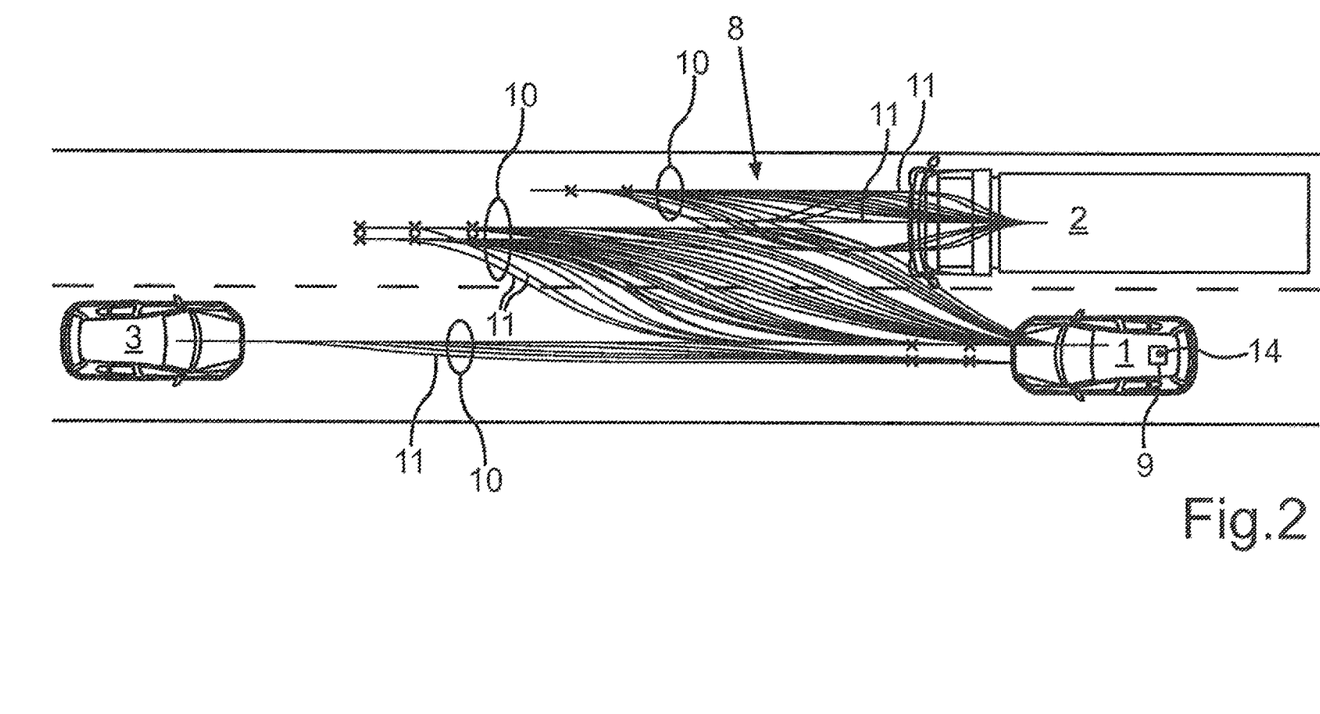
FIG. 2 shows a schematic illustration of the transportation vehicles of FIG. 1 with an illustration of possible driving trajectories of the transportation vehicles.

FIG. 2 illustrates how the trajectory data 8 for each of the transportation vehicles 1, 2, 3, describes a family 10 of potential future driving trajectories 11 of each transportation vehicle 1, 2, 3. For the sake of clarity, in FIG. 2 only a few of the driving trajectories 11 are provided with a reference number. The control device 9 can now determine for each of the transportation vehicles, on the basis of the driving trajectories 11 of each family 10, which driving trajectory it should follow or use, so that all three transportation vehicles 1, 2, 3 can continue without collisions.

Figure 3:
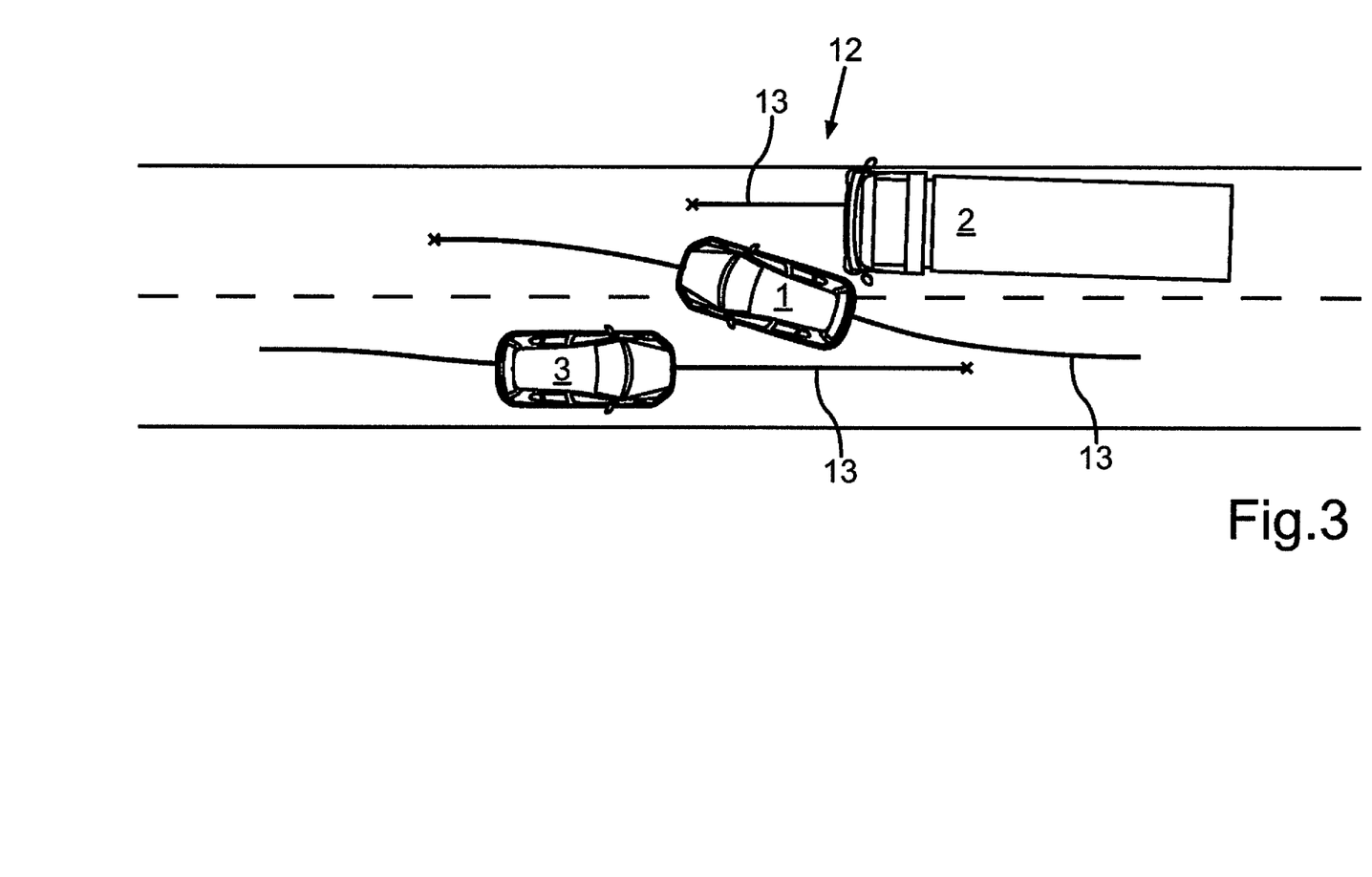
FIG. 3 shows a schematic representation of the transportation vehicles of FIG. 1, while the transportation vehicles are performing a collision-free avoidance maneuver.

FIG. 3 shows a possible resulting avoidance maneuver 12, in which each of the transportation vehicles 1, 2, 3 takes an avoidance trajectory 13, resulting in a collision-free maneuver.

The number of possible driving trajectories 11 per family 10 can be so large that is not possible for the control device 9 to examine all possible combinations of the driving trajectory in time to verify whether they result in an optimal avoidance maneuver 12 in terms of an optimization criterion 14, which is taken as a basis for selecting one of the driving trajectories 11 as an avoidance trajectory 13.

Figure 4:
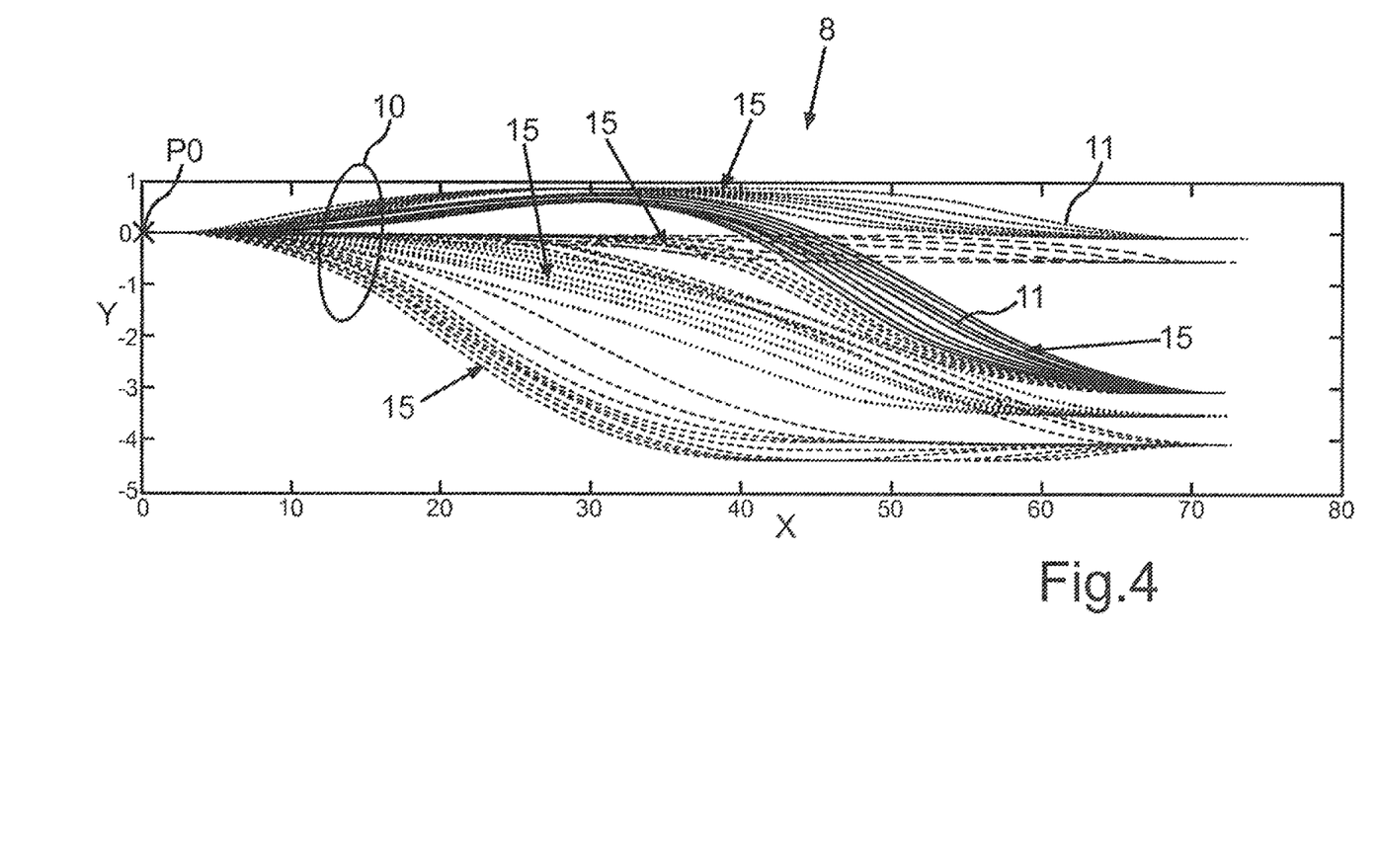
FIG. 4 shows a schematic representation of a family of possible driving trajectories that are described by trajectory data of a transportation vehicle and are classified into groups.

FIG. 4 schematically illustrates for the trajectory data 8 of an individual transportation vehicle, how the family 10 of the driving trajectories 11 can be classified into groups 15. Each group 15 is represented by a different line style.

FIG. 4 shows how, on the basis of a current actual position P0 of the transportation vehicle, a movement along a straight-ahead direction X and a lateral direction Y is given by each driving trajectory 11. Similar driving trajectories 11 are merged to form each of the groups 15. The merge operation is described later in the description in connection with FIG. 6.

Figure 5:
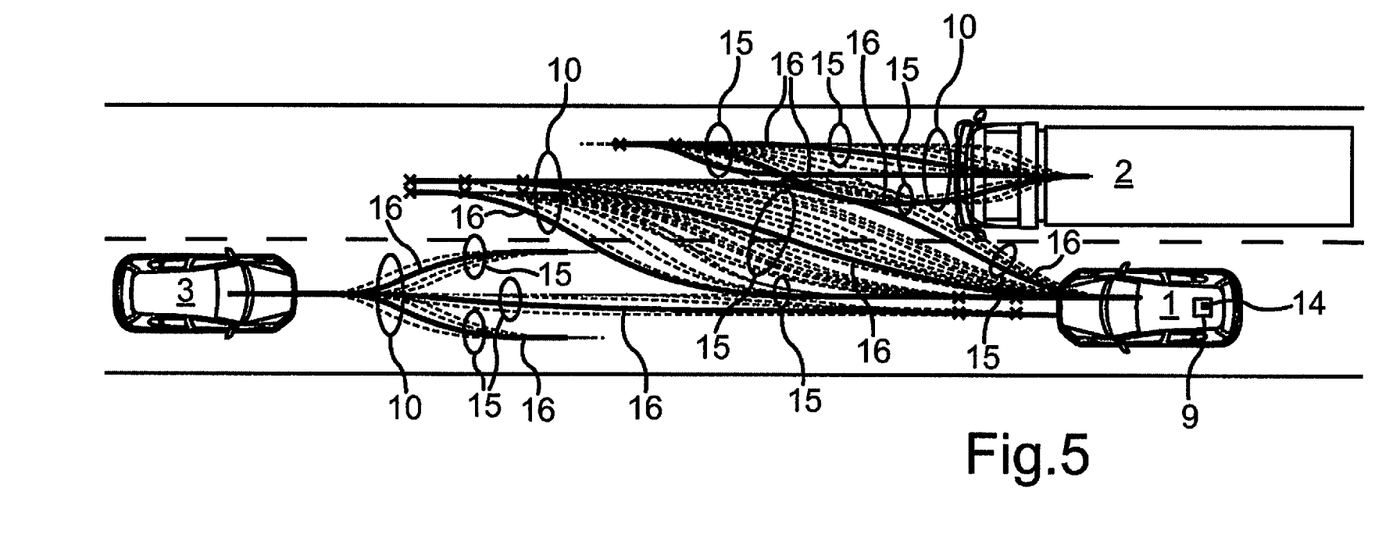
FIG. 5 shows a schematic representation of the transportation vehicles in the driving situation of FIG. 1, illustrating group trajectories that represent the possible trajectories.

FIG. 5 illustrates how initially for each group 15 of a family 10 a group trajectory 16 can be determined, which in each case represents or replaces the driving trajectories 11 contained in the group 15. By each group 15 comprising a plurality of driving trajectories 11 but each group 15 being represented by a single group trajectory 16, fewer group trajectories 15 are obtained than the total number of driving trajectories 11 described by the trajectory data 8.

It is now only necessary for the control device 9 to check the possible combinations for each of the group trajectories 16 in a single combination operation, to determine which one satisfies or best satisfies the optimization criterion 14. The associated group trajectories 16 of each transportation vehicle 1, 2, 3 can then be used as the relevant avoidance trajectory 13.

Figure 6:
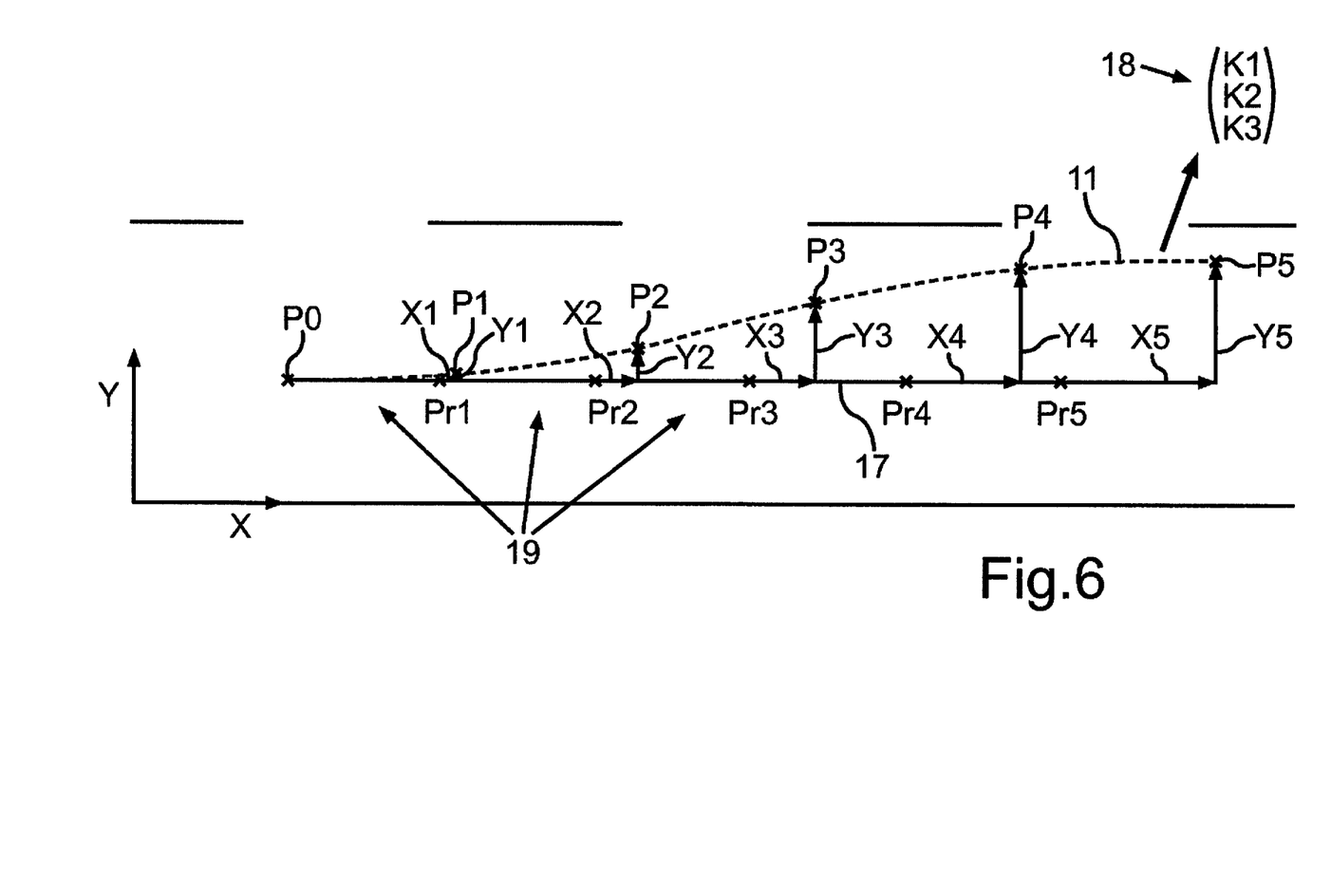
FIG. 6 shows a sketch to illustrate a classification operation in which similarity data from driving trajectories with a reference trajectory are determined.

FIG. 6 illustrates how such driving trajectories 11 that are similar in terms of a similarity measure can be merged to determine the groups 15. FIG. 6 illustrates how for a single driving trajectory 11, starting from the actual position P0 the driving trajectory 11 is compared with a reference trajectory 17 and a characteristic point or characteristic vector 18 can thereby be formed from, for example, three parameters K1, K2, K3, which represents or describes the driving trajectory 11 in relation to the reference trajectory 17. The characteristic vector 18 represents similarity data. The characteristic values K1, K2, K3 represent a similarity measure.

The reference trajectory 17 in the example shown is driving in a straight line starting from the actual position P0, that is to say, along the longitudinal direction X without deviation in the lateral direction Y. For a plurality of time operations 19, that is, for times t1, t2, t3, t4, t5, the resulting position P1, P2, P3, P4, P5 according to the driving trajectory 11 and the resulting position Pr1, Pr2, Pr3, Pr4, Pr5 according to the reference trajectory 17 are both determined. Thus, for each time operation 19 a deviation ΔX in the longitudinal direction (here designated as X1, X2, X3, X4, X5) and a deviation ΔY in the lateral direction (here designated as Y1, Y2, Y3, Y4, Y5) can be determined. The number of time operations 19 is here given by n, e.g., n=5:

$$K_1 = \frac{1}{n}\sum_{i=1}^{n} \Delta X_i$$

$$K_2 = \frac{1}{n}\sum_{i=1}^{n} |\Delta Y_i|$$

$$K_3 = \Delta Y_n$$

The variables involved are:

$K_1$ is the deviation in the X-direction;
$K_2$ is the magnitude of the deviation in the Y-direction and
$K_3$ is the final deviation in the Y-direction (here Y5).

The summed values $K_1$, $K_2$, $K_3$ can be used as the characteristic values $K_1$, $K_2$, $K_3$. The resulting characteristic vectors 18 can then be merged using a cluster analysis into a specified number of clusters, each of which then produces one of the groups 15.

To perform a cluster analysis therefore, each individual driving trajectory 11 is evaluated with respect to its spatial course relative to a reference trajectory 17. The reference trajectory 17 corresponds, for example, to an unaccelerated linear movement. A total of, e.g., three criteria or characteristic values $K_1$, $K_2$, $K_3$ can be calculated, which characterize the course of a trajectory 11. The calculation is performed by a time-discrete sampling of the trajectory 11 and the reference trajectory 17 in accordance with the n time operations 19.

The cluster analysis of the trajectory evaluations or characteristic vectors 18 is used to find the groups 15 of similar trajectories 11. Similar trajectories 11 in connection with the maneuver planning mean trajectories 11 which cover a common area of the road over the entire duration of the maneuver, which differs from the areas of the other groups.

The method described above of During et al. can be used to provide additional or other evaluation criteria for the cluster analysis. A suitable method for a cluster analysis is, for example, the k-means algorithm, in particular, the k-Means++ algorithm. This is an iterative procedure, which can identify a predefined number of clusters (groups) within a set of multi-dimensional data points, here the characteristic vectors 18. The Euclidean metric can be used as a distance measure. FIG. 4 shows an example of a trajectory family 10 with individual trajectories 11 that has been divided into groups 15.

On the basis of the group trajectories 16 the trajectory combination can then be carried out. The overall problem of the trajectory combination is therefore decomposed into a plurality of smaller, manageable combination problems to achieve real-time capability. To obtain the most promising sub-problems, the information from the previous cluster analysis is used to selectively combine spatially different group trajectories 16 together. FIG. 5 illustrates the principle. Out of the total family 10 of the trajectories 11 of each transportation vehicle 1, 2, 3, on the basis of the cluster classification trajectories 11 of different cluster membership or groups 15 are selected as a subset or representative group trajectory 16. The combination of one such group trajectory 16 per transportation vehicle 1, 2, 3 defines a portion of the total combination problem.

In the event of an incomplete solution to the problem this composition of the sub-problems nevertheless ensures that a wide range of variation possibilities has been rapidly checked for freedom of association.

The described algorithm for searching for collision-free trajectory combinations of a plurality of transportation vehicles 1, 2, 3 thus proceeds in several stages. Firstly, for the trajectories 11 of each transportation vehicle 1, 2, 3 a similarity or cluster analysis is performed. To perform this analysis, each individual trajectory 11 is evaluated relative to a reference trajectory 17 (for example, driving in a straight line) with regard to its spatial course using three criteria or characteristic values, for example, $K_1$, $K_2$, $K_3$. This is followed by a cluster analysis of all trajectories 11 on the basis of the previously determined evaluation criteria $K_1$, $K_2$, $K_3$. The result of the cluster analysis is a classification of the family 10 of trajectories of a transportation vehicle 1, 2, 3 into groups 15 of similar trajectories 11. The group membership of the trajectories 11 is used in the subsequent combination process, to selectively examine combinations of trajectories with group trajectories 16 that differ spatially as far as possible for collision avoidance.

In the event that the available calculation time is not sufficient to examine all existing possible combinations for collision avoidance and to evaluate them in terms of their costs (in the sense of the optimization criterion 14), in a wide range of scenarios in which possible solutions exist in principle this sample-based heuristic method nevertheless allows a) a solution to be found at all, and b) by the targeted testing of spatially different group trajectories 16, qualitatively better avoidance trajectories 13 to be determined. Qualitatively better in this context means to determine a combination with a minimum cost value in accordance with the optimization criterion 14.

The approach presented therefore allows collision-free avoidance maneuvers 12 to be determined from a plurality of possible action options or possible trajectories 11, while taking real-time capability requirements into account. There is intentionally no abstraction performed on the action, i.e., no transportation vehicle 1, 2, 3 has a predetermined behavior and no prioritization of transportation vehicles is made. All transportation vehicles are treated on an equal basis. Compared to ego-centered and transportation vehicle-individual planning approaches, this coordinated planning approach between multiple transportation vehicles 1, 2, 3 is able to solve critical traffic situations more reliably by the coordination of the transportation vehicles 1, 2, 3.

Overall, the example shows how a real-time capable combinatorial algorithm for determining collision-free trajectories of multiple transportation vehicles can be provided by the disclosed embodiments.

LIST OF REFERENCE NUMERALS 1 transportation vehicle
2 transportation vehicle
3 transportation vehicle
4 oncoming lane
5 environment monitoring device
6 risk of collision
7 trajectory generator
8 trajectory data
9 control device
10 family
11 potential driving trajectory
12 avoidance maneuver
13 avoidance trajectory
14 optimization criterion
15 group
16 group trajectory
17 reference trajectory
18 characteristic vector
19 time operation
K1-K5 characteristic value
P0 actual position
P1-P5 position
Pr1-Pr5 position
X direction of travel in straight line
X1-X5 deviation in longitudinal direction
Y transverse direction of travel
Y1-Y5 deviation in transverse direction

The invention claimed is:

1. A method for determining avoidance trajectories for a collision avoidance maneuver of a plurality of transportation vehicles, wherein a control device performs the method comprising:
receiving, from at least one trajectory generator, trajectory data for each transportation vehicle of the plurality of transportation vehicles, the trajectory data describing a family of possible driving trajectories of the respective transportation vehicle;
classifying, in a classification operation, the family of driving trajectories for each transportation vehicle into a plurality of groups of driving trajectories, wherein each group comprises a plurality of the driving trajectories and wherein classifying includes determining a longitudinal deviation along an extension direction of a reference trajectory and a lateral deviation along a direction perpendicular to the reference trajectory for a predetermined number of time operations n, and determining a summed value of the longitudinal deviation and the lateral deviation and a resulting final deviation for a final time operation;
selecting, from each group of the driving trajectories, a group trajectory indicative of the respective group of the driving trajectories;
selecting at least one group trajectory for each of the transportation vehicles;
combining, in at least one combination operation, the selected group trajectories;
simulating a resulting coordinated driving maneuver of the transportation vehicles, the driving maneuver determined based on the combination of the selected group trajectories, to determine whether the driving maneuver satisfies a predetermined optimization criterion based on the selected group of trajectories; and
in response to the predetermined optimization criterion being satisfied, identifying each of the selected group trajectories as an avoidance trajectory of the respective transportation vehicle.

2. The method of claim 1, wherein a driver assistance system of the transportation vehicle performs the avoidance maneuver using the respective avoidance trajectory in the respective transportation vehicle.

3. The method of claim 1, wherein the classification operation determines similarity data based on a predetermined similarity measure with reference to a respective reference trajectory for each driving trajectory of the family of a respective transportation vehicle.

4. The method of claim 1, wherein a predetermined number of groups is defined per family.

5. The method of claim 1, wherein the classification operation is carried out using a cluster analysis.

6. The method of claim 1, further comprising selecting a mean driving trajectory or a random driving trajectory as the respective group trajectory for each of the transportation vehicles from each group.

7. The method of claim 1, wherein the at least one combination operation is performed entirely within a predetermined time interval and, in response to the at least one combination operation satisfying the optimization criterion prior to the end of the time interval, examining at least one driving trajectory from the group represented by the group trajectory that satisfies the optimization criterion for the optimization criterion.

8. The method of claim 1, wherein the reference trajectory comprises a trajectory indicative of driving the transportation vehicle uniformly and in a straight line.

9. The method of claim 8, wherein driving in the straight line includes driving tangentially to a center of a driving lane or driving straight ahead as a result of maintaining a direction of travel of the transportation vehicle.

10. The method of claim 1, wherein the reference trajectory comprises a trajectory that includes maintaining a driving course of the transportation vehicle as the transportation vehicle drives around a bend.

11. A control device for a transportation vehicle, having a receiving device for receiving trajectory data, which describe a family of possible driving trajectories, and a computing device configured to carry out a method for determining avoidance trajectories for a collision avoidance maneuver of a plurality of transportation vehicles, wherein a control device is configured to:
receive, from at least one trajectory generator, trajectory data for each transportation vehicle of the plurality of transportation vehicles, the trajectory data describing a family of possible driving trajectories of the respective transportation vehicle;
classify, in a classification operation, the family of driving trajectories for each transportation vehicle into a plurality of groups of driving trajectories, wherein each group comprises a plurality of the driving trajectories and wherein classifying includes determining a longitudinal deviation along an extension direction of a reference trajectory and a lateral deviation along a direction perpendicular to the reference trajectory for a predetermined number of time operations n, and determining a summed value of the longitudinal deviation and the lateral deviation and a resulting final deviation for a final time operation;
select, from each group of the driving trajectories, a group trajectory indicative of the respective group of the driving trajectories;
select at least one group trajectory for each of the transportation vehicles;
combine, in at least one combination operation, the selected group trajectories;
simulate a resulting coordinated driving maneuver of the transportation vehicles, the driving maneuver determined based on the combination of the selected group trajectories, to determine whether the driving maneuver satisfies a predetermined optimization criterion based on the selected group of trajectories; and
in response to the predetermined optimization criterion being satisfied, identify each of the selected group trajectories as an avoidance trajectory of the respective transportation vehicle.

12. The control device of claim 11, wherein a driver assistance system of the transportation vehicle performs the avoidance maneuver using the respective avoidance trajectory in the respective transportation vehicle.

13. The control device of claim 11, wherein the classification operation determines-similarity data based on a predetermined similarity measure with reference to a respective reference trajectory for each driving trajectory of the family of a respective transportation vehicle.

14. The control device of claim 11, wherein a predetermined number of groups is defined per family.

15. The control device of claim 11, wherein the classification operation is carried out using a cluster analysis.

16. The control device of claim 11, wherein the method further comprises selecting a mean driving trajectory or a random driving trajectory as the respective group trajectory for each of the transportation vehicles from each group.

17. The control device of claim 11, wherein the at least one combination operation is performed entirely within a predetermined time interval and, a response to the at least one combination operation satisfying the optimization criterion prior to the end of the time interval, examining at least one driving trajectory from the group represented by the group trajectory that satisfies the optimization criterion for the optimization criterion.

18. A transportation vehicle including a control device including a receiving device for receiving trajectory data, which describe a family of possible driving trajectories, and a computing device configured to carry out a method for determining avoidance trajectories for a collision avoidance maneuver of a plurality of transportation vehicles, wherein a control device performs the method comprising:

receiving, from at least one trajectory generator, trajectory data for each transportation vehicle of the plurality of transportation vehicles, the trajectory data describing a family of possible driving trajectories of the respective transportation vehicle;

classifying, in a classification operation, the family of driving trajectories for each transportation vehicle into a plurality of groups of driving trajectories, wherein each group comprises a plurality of the driving trajectories and wherein classifying includes determining a longitudinal deviation along an extension direction of a reference trajectory and a lateral deviation along a direction perpendicular to the reference trajectory for a predetermined number of time operations n, and determining a summed value of the longitudinal deviation and the lateral deviation and a resulting final deviation for a final time operation;

selecting, from each group of the driving trajectories, a group trajectory indicative of the respective group of the driving trajectories;

selecting at least one group trajectory for each of the transportation vehicles;

combining, in at least one combination operation, the selected group trajectories;

simulating a resulting coordinated driving maneuver of the transportation vehicles, the driving maneuver determined based on the combination of the selected group trajectories, to determine whether the driving maneuver satisfies a predetermined optimization criterion based on the selected group of trajectories; and in response to the predetermined optimization criterion being satisfied, identifying each of the selected group trajectories as an avoidance trajectory of the respective transportation vehicle.

19. The transportation vehicle of claim 18, wherein a driver assistance system of the transportation vehicle performs the avoidance maneuver using the respective avoidance trajectory in the respective transportation vehicle.

20. The transportation vehicle of claim 18, wherein the classification operation determines-similarity data based on a predetermined similarity measure with reference to a respective reference trajectory for each driving trajectory of the family of a respective transportation vehicle.

21. The transportation vehicle of claim 18, wherein a predetermined number of groups is defined per family.

22. The transportation vehicle of claim 18, wherein the classification operation is carried out using a cluster analysis.

23. The transportation vehicle of claim 18, wherein the method further comprises selecting a mean driving trajectory or a random driving trajectory as the respective group trajectory for each of the transportation vehicles from each group.

24. The transportation vehicle of claim 18, wherein the at least one combination operation is performed entirely within a predetermined time interval and, a response to the at least one combination operation satisfying the optimization criterion prior to the end of the time interval, examining at least one driving trajectory from the group represented by the group trajectory that satisfies the optimization criterion for the optimization criterion.

* * * * *